United States Patent
Shveidel et al.

(10) Patent No.: US 11,593,028 B2
(45) Date of Patent: Feb. 28, 2023

(54) ADAPTIVE TURBO TOGGLING

(71) Applicant: EMC IP Holding Company LLC, Hopkinton, MA (US)

(72) Inventors: Vladimir Shveidel, Pardes-Hana (IL); Alexei Kabishcer, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 17/198,551

(22) Filed: Mar. 11, 2021

(65) Prior Publication Data
US 2022/0291866 A1 Sep. 15, 2022

(51) Int. Cl.
*G06F 3/06* (2006.01)
*G06N 20/00* (2019.01)

(52) U.S. Cl.
CPC .......... *G06F 3/0659* (2013.01); *G06F 3/0613* (2013.01); *G06F 3/0641* (2013.01); *G06F 3/0653* (2013.01); *G06F 3/0673* (2013.01); *G06N 20/00* (2019.01)

(58) Field of Classification Search
CPC .... G06F 3/0659; G06F 3/0613; G06F 3/0641; G06F 3/0653; G06N 20/00
USPC ....................................................... 711/154
See application file for complete search history.

(56) References Cited

U.S. PATENT DOCUMENTS

| 9,230,121 | B1 | 1/2016 | Kelley et al. | |
|---|---|---|---|---|
| 10,049,116 | B1* | 8/2018 | Bajpai | G06F 11/1453 |
| 2014/0244598 | A1* | 8/2014 | Haustein | G06F 16/2365 |
| | | | | 707/692 |
| 2017/0351453 | A1* | 12/2017 | Malladi | G06F 3/0604 |
| 2019/0212935 | A1* | 7/2019 | Egbert | G06F 3/0641 |
| 2021/0034577 | A1 | 2/2021 | Faibish et al. | |
| 2021/0271397 | A1* | 9/2021 | Wu | G06F 3/0673 |

OTHER PUBLICATIONS

Gao, Hongpo, et al.; "Selective Utilization of Processor Cores While Rebuilding Data Previously Stored on a Failed Data Storage Drive," U.S. Appl. No. 17/038,534, filed Sep. 30, 2020.

* cited by examiner

*Primary Examiner* — Christopher B Shin
(74) *Attorney, Agent, or Firm* — BainwoodHuang

(57) ABSTRACT

A method of operating a computing device for processing data is provided. The method includes (a) monitoring a set of performance characteristics of the processing of the data; (b) periodically calculating, using a predefined set of coefficients, a linear combination of the monitored set of performance characteristics to yield a combined metric; and (c) upon detecting that the combined metric exceeds a threshold while operating in a first processing mode, transitioning from operating in the first processing mode to operating in a second processing mode. (1) The second processing mode has a higher bandwidth than the first processing mode, and (2) processing of data in the second processing mode is less robust than processing of data in the first processing mode. An apparatus, system, and computer program product for performing a similar method are also provided.

14 Claims, 5 Drawing Sheets

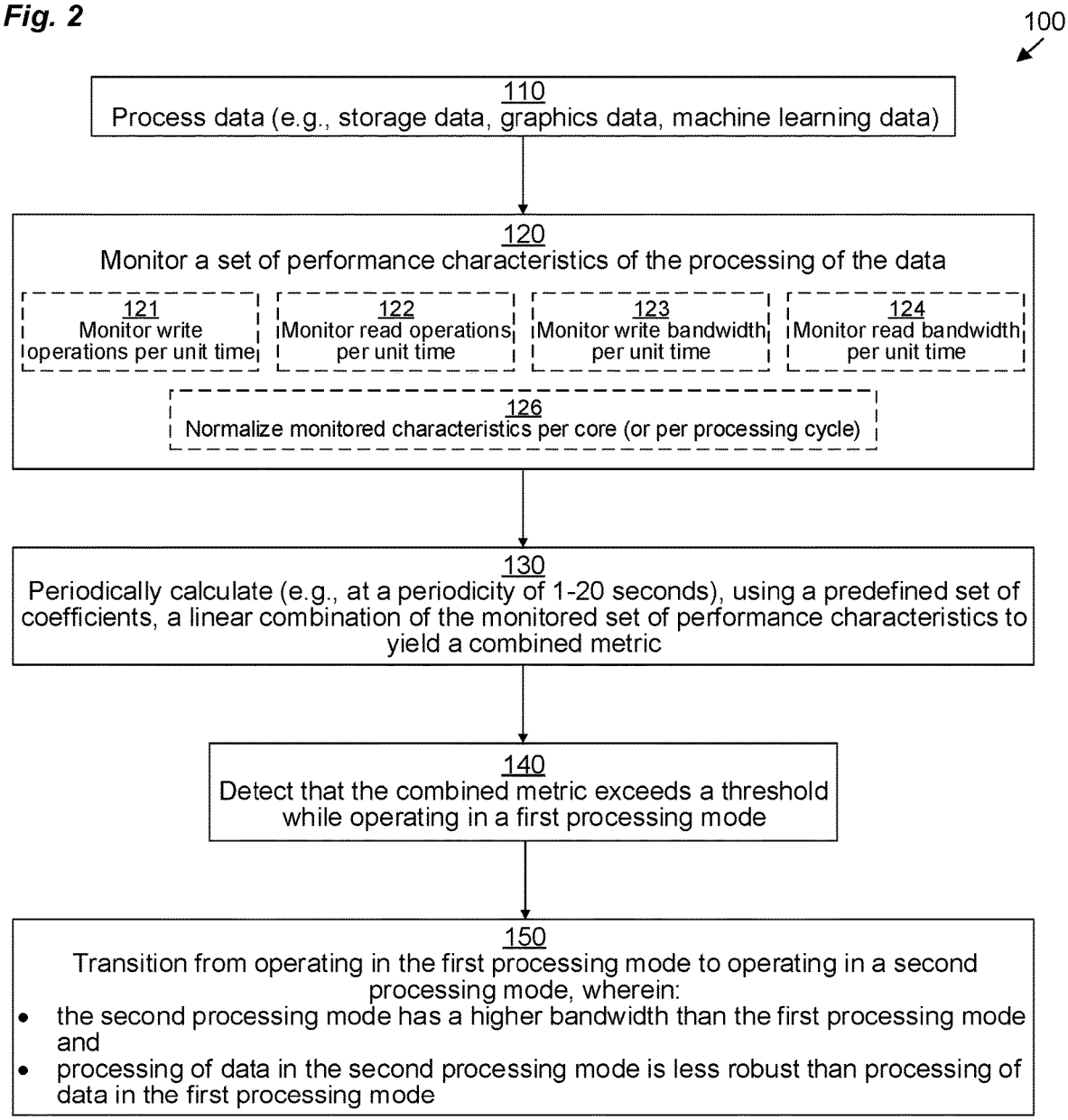

ADAPTIVE TURBO TOGGLING

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems utilize a deduplication feature to save storage space by refraining from storing identical blocks of data multiple times. Deduplication, and other space saving techniques such as compression, can be applied in real time (or inline) as data is ingested and stored. However, inline deduplication and compression significantly increase the processing resources needed to ingest data. During peak periods, the total processing load may exceed a capacity of the storage system due to inline deduplication and/or compression, leading to increased latency. Therefore, some systems are configured to enter a "turbo" mode during which inline deduplication and/or compression (as well as various background operations) are turned off during peak periods identified by time of day.

SUMMARY

Unfortunately, identification of peak periods by time of day for engaging a turbo mode may be overly broad, resulting in long "peak" periods (e.g., 8 am-noon and 1:30 pm-6 pm) followed by long non-peak periods (e.g., 6 pm-8 am and noon-1:30 pm), even though usage during the "peak" periods may not be uniformly high and even though usage during non-peak periods may not be uniformly low. Thus, turbo mode may be engaged for longer consecutive periods than necessary, and it may also be disengaged for longer consecutive periods than optimal. However, running in turbo mode for too long can be suboptimal because it can result in a large backlog of background operations to be made up during the non-turbo periods, even though processing capacity remained unused during the peak periods. In addition, running in turbo mode for too long also runs the risk of causing the storage system to run out of storage space due to insufficient space-saving. In addition, running in normal mode for too long can be suboptimal because, if usage patterns are abnormally high on occasion during off-peak hours, then latency may be too high during those occasions.

One possible solution is to instead identify peak times by using a reference table. The reference table may identify situations during which turbo mode is appropriate, such as by identifying ranges of values of particular parameters or for several different parameters that are considered to represent peak usage periods. However, a drawback to this approach is that it only covers the specific situations that have been pre-evaluated and placed into the table.

Another possible solution is to instead use an adaptive technique that continuously measures system utilization, repeatedly turning turbo mode on in response to the utilization being too high and off in response to the utilization being too low. However, a drawback to this approach is that it is very resource-intensive, and it does not provide a significant improvement.

Thus, it would be desirable to operate a storage system to efficiently toggle between normal and turbo mode in a manner that is responsive to widely varying conditions. This may be accomplished by periodically monitoring performance characteristics and taking a predefined linear combination of those values to yield a combined metric that can be used to easily assess load. When the combined metric rises above a high watermark, turbo mode may be engaged; when the combined metric drops below a low watermark, turbo mode may be disengaged. In some embodiments, the low watermark may be dynamically adjusted to prevent constant switching in the event of rapid oscillation of the combined metric. It should be understood that although described in the context of a data storage system, such techniques can also be used in other data processing contexts, such as for computer graphics and machine learning.

In one embodiment, a method of operating a computing device for processing data is provided. The method includes (a) monitoring a set of performance characteristics of the processing of the data; (b) periodically calculating, using a predefined set of coefficients, a linear combination of the monitored set of performance characteristics to yield a combined metric; and (c) upon detecting that the combined metric exceeds a threshold while operating in a first processing mode, transitioning from operating in the first processing mode to operating in a second processing mode. (1) The second processing mode has a higher bandwidth than the first processing mode, and (2) processing of data in the second processing mode is less robust than processing of data in the first processing mode. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 2 is a flowchart depicting an example procedure according to various embodiments.

DETAILED DESCRIPTION OF THE INVENTION

Embodiments are directed to techniques for operating a storage system to efficiently toggle between normal and turbo mode in a manner that is responsive to widely varying conditions. This may be accomplished by periodically monitoring performance characteristics and taking a predefined linear combination of those values to yield a combined metric that can be used to easily assess load. When the combined metric rises above a high watermark, turbo mode may be engaged; when the combined metric drops below a low watermark, turbo mode may be disengaged. In some embodiments, the low watermark may be dynamically adjusted to prevent constant switching in the event of rapid oscillation of the combined metric. It should be understood that although described in the context of a data storage system, such techniques can also be used in other data processing contexts, such as for computer graphics and machine learning.

Figure 1:
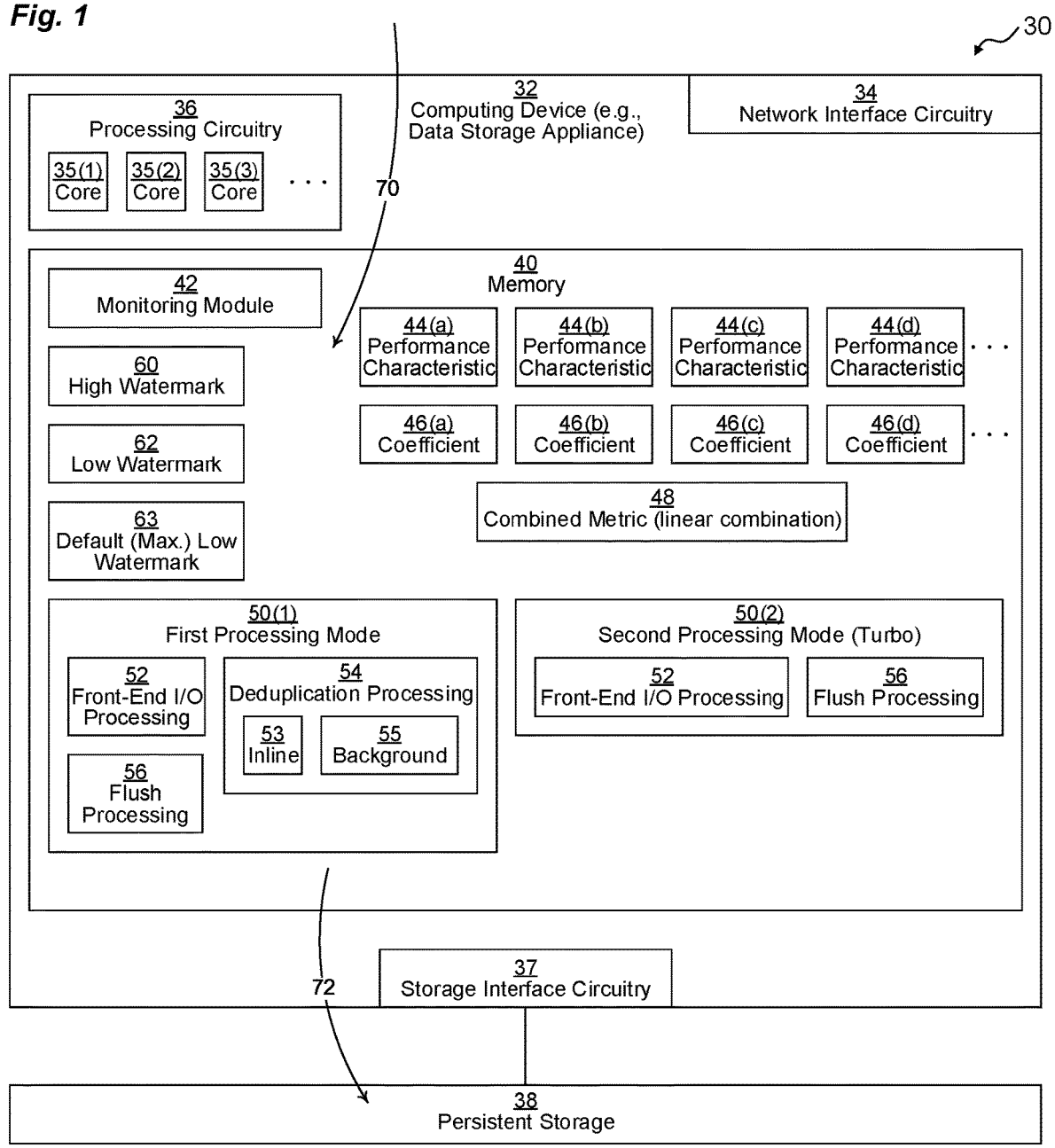
FIG. 1 is a block diagram depicting an example system, apparatus, and data structure arrangement for use in connection with various embodiments.

FIG. 1 depicts an example environment 30 for use in connection with various embodiments. Environment 30 includes a computing device 32. Computing device 32 may be any kind of computing device, such as, for example, a personal computer, workstation, server computer, enterprise server, data storage array device, laptop computer, tablet computer, smart phone, mobile computer, etc. In an example embodiment, computing device 32 may be a data storage appliance configured to provide access to persistent storage 38.

Computing device 32 may include network interface circuitry 34, processing circuitry 36, storage interface circuitry 37, and memory 40. In some embodiments (not depicted), computing device 32 also includes a graphics processor and a graphics adapter that connects to a display device.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above. As depicted, processing circuitry 36 includes a plurality of cores 35 (depicted as cores 35(1), 35(2), 35(3), . . . ).

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes one or more non-transitory persistent storage drives (not depicted), such as, for example, hard disk drives, solid-state storage devices (SSDs), flash drives, etc.

Network interface circuitry 34 may include one or more Ethernet cards, cellular modems, Fibre Channel (FC) adapters, InfiniBand adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc.

Memory 40 may include any kind of digital system memory, such as, for example, random access memory (RAM). Memory 40 stores an operating system (OS) (not depicted) and various drivers (e.g., storage drivers, not depicted) in operation (e.g., a Linux, UNIX, Windows, MacOS, or similar operating system). Memory 40 also stores a monitoring module 42, front-end processing module 52, deduplication processing module 54, flush processing module 56, and other software modules (not depicted) which each execute on processing circuitry 36.

Memory 40 also stores various variables, including values of a set of performance characteristics 44 (depicted as performance characteristics 44(a), 44(b), 44(c), 44(d), . . . ), and a combined metric 48. Memory 40 also stores a low watermark 62, which, in some embodiments, may also be a variable.

Memory 40 also stores various constants, including values of a set of coefficients 46 (depicted as coefficients 46(a), 46(b), 46(c), 46(d), . . . ), a high watermark 60, and, in some embodiments, a default (maximum) low watermark 63.

Memory also stores input data 70, typically received from a network via network interface circuitry 34. Upon processing by data processing modules, such as front-end processing module 52 and possibly deduplication processing module 54, input data 70 is transformed into output data 72. In some embodiments, as depicted, output data 72 is moved to persistent storage 38 by flush processing module 56.

Memory 40 may also store various other data structures used by the OS, modules 42, 52, 54, 56, and various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the computing device 32 is powered off. The OS, modules 42, 52, 54, 56, and various other applications and drivers are typically stored in this persistent storage portion of memory 40 or on persistent storage 38 so that they may be loaded into a system portion of memory 40 upon a system restart or as needed. The OS, modules 42, 52, 54, 56, and various other applications and drivers, when stored in non-transitory form either in the volatile portion of memory 40, or on persistent storage 38 or in persistent portion of memory 40, each form a computer program product. The processing circuitry 36 running one or more applications thus forms a specialized circuit constructed and arranged to carry out the various processes described herein.

FIG. 2 illustrates an example method 100 performed by computing device 32. It should be understood that any time a piece of software (e.g., OS, modules 42, 52, 54, 56, etc.) is described as performing a method, process, step, or function, what is meant is that a computing device (e.g., computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, the computing device 32 processes input data 70, thereby generating output data 72. It should be understood that although depicted as a first step, step 110 actually continues throughout method 100.

Figure 3A:
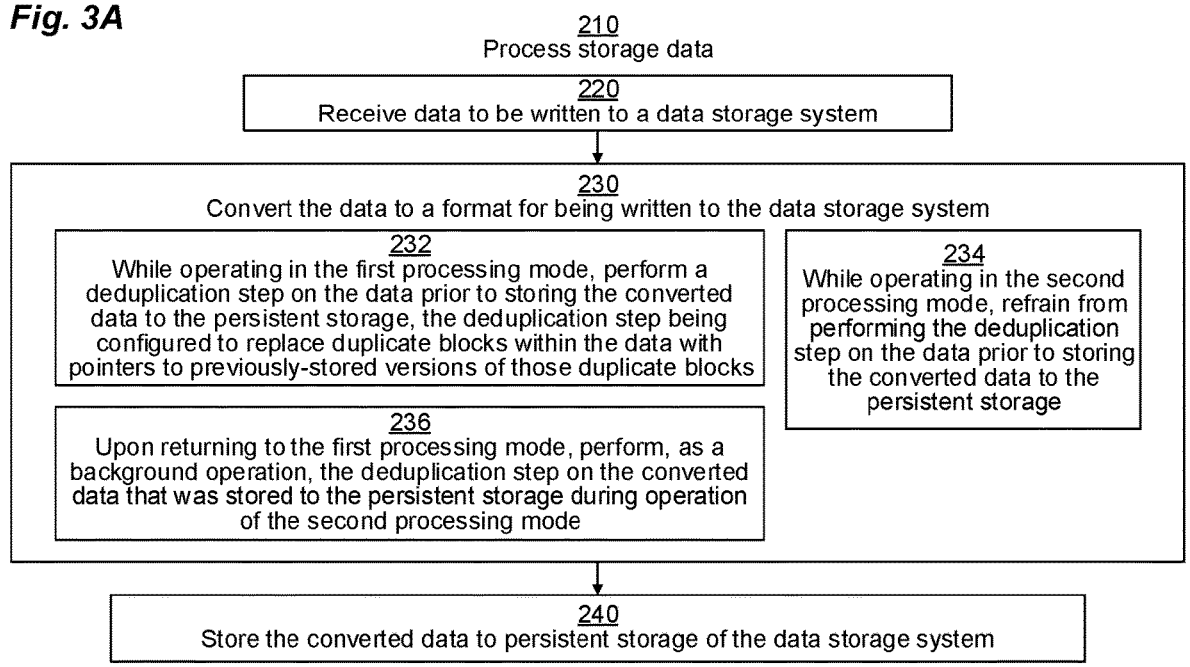
FIGS. 3A-3C are flowcharts depicting example procedures according to various alternative embodiments.
Figure 3B:
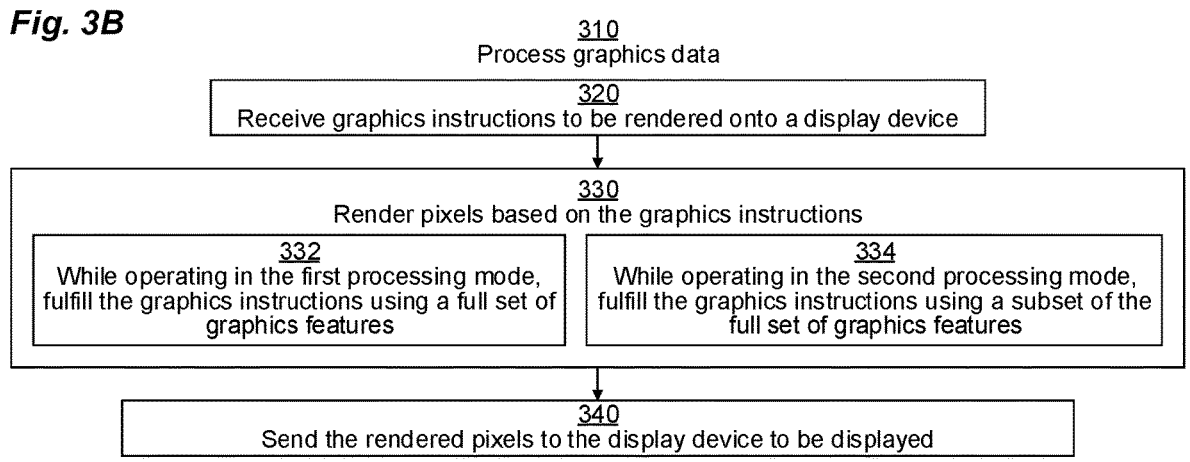
Figure 3C:
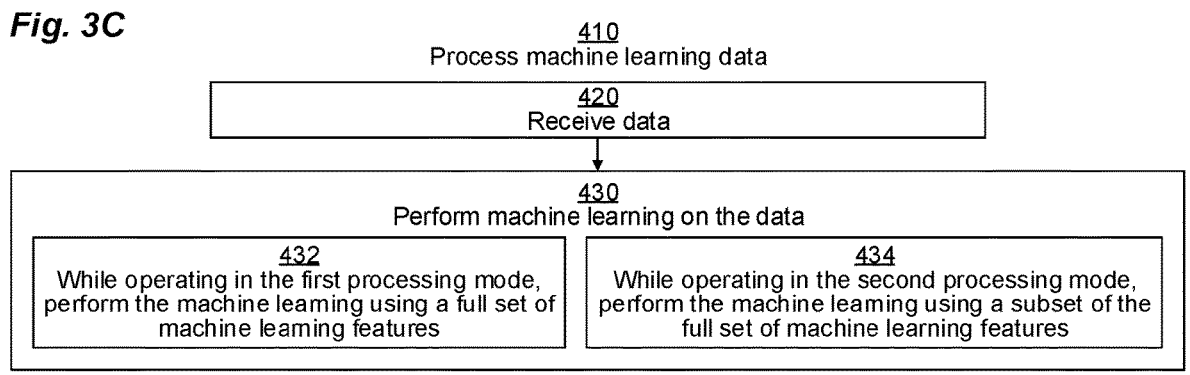

In some example embodiments, step 110 may be realized as method 210 for processing storage data (FIG. 3A), method 310 for processing graphics data (FIG. 3B), or method 410 for processing machine learning data (FIG. 3C).

FIG. 3A depicts method 210 for processing storage data. In step 220, front-end I/O processing module 52 receives input data 70 to be written to a data storage system.

Then, in step 230, front-end I/O processing module 52 and/or deduplication processing module 54 (and/or another processing module, such as a compression processing module, not depicted) converts the input data 70 to a format for being written to the data storage system as output data 72. For example, front-end I/O processing module 52 reorganizes blocks of input data 70 into a different organizational scheme and creates appropriate metadata (not depicted). In addition, step 230 may include sub-steps 232, 234, 236. In sub-step 232, while operating in a first ("normal") processing mode 50(1) (see FIG. 1), deduplication processing module 54 performs an inline deduplication step (e.g., by inline deduplication processing module 53) on the data 70 prior to storing the converted data 72 to the persistent storage 38, the deduplication step being configured to replace duplicate blocks within the input data 70 with pointers to previously-stored versions of those duplicate blocks. In sub-step 234, while operating in a second ("turbo") processing mode 50(2) (see FIG. 1), deduplication processing module 54 refrains from performing the deduplication step on the data 70 prior to storing the converted data 72 to the persistent storage 38. In addition, in sub-step 236, upon returning to the first processing mode 50(1), deduplication processing module 54 performs (e.g., by background deduplication processing module 55), as a background operation, the deduplication step on the converted data 72 that was previously stored to the persistent storage 38 during operation of the second processing mode 50(2).

In step 240, flush processing module 56 stores the output data 72 generated in step 230 (e.g., in sub-steps 232, 234) in persistent storage 38.

FIG. 3B depicts method 310 for processing graphics instructions. In step 320, computing device 32 receives input data 70 to be rendered onto a display device. In an example embodiment, the input data 70 is received by a graphics processor of the computing device 32.

Then, in step 230, computing device 32 (by its graphics processor) renders the input graphics instructions 70 into pixels of output data 72. In sub-step 332, while operating in the first processing mode 50(1), computing device 32 fulfills the graphics instructions using a full set of graphics features. The full set of graphics features may include all or many of the graphics rendering options that the graphics processor is configured to be able to perform. In an example embodiment, the full set includes basic 3-dimensional graphics rendering plus enhanced features, such as anti-aliasing. In sub-step 334, while operating in the second processing mode 50(2), computing device 32 fulfills the graphics instructions using a subset of the full set of graphics features. The subset includes some of the graphics rendering options that the graphics processor is configured to be able to perform to the exclusion of others. In an example embodiment, the full set includes basic 3-dimensional graphics rendering without one or more enhanced features (e.g., without anti-aliasing). In step 340, computing device 32 (by its graphics adapter) sends the output data 72 (e.g., stored in a graphics buffer) to be displayed on a display device.

FIG. 3C depicts method 410 for processing machine learning data. In step 420, computing device 32 receives input data 70 to be analyzed. Then, in step 430, computing device performs machine learning analysis on the input data 70 to generate output data 72. In sub-step 432, while operating in the first processing mode 50(1), computing device 32 performs the machine learning analysis using a full set of machine learning features. The full set of machine learning features may include all or many of the machine learning options that the computing device 32 is configured to be able to perform. In sub-step 434, while operating in the second processing mode 50(2), computing device 32 performs the machine learning analysis using a subset of the full set of machine learning features. The subset includes some of the machine learning options that the computing device 32 is configured to be able to perform to the exclusion of others.

Returning to FIG. 2, in step 120, computing device 32 (e.g., monitoring module 42) monitors a set of performance characteristics 44 of the processing of the data. In some embodiments, such as a data storage embodiment as depicted in FIG. 3A, monitoring module 42 performs one or more of sub-steps 121-124 and optionally also sub-step 126.

In sub-step 121, monitoring module 42 monitors the number of write operations performed per unit time (e.g., per second), storing the result as a performance characteristic 44 (e.g., performance characteristic 44(a)). This monitoring may be performed over the course of a monitoring period, such as, for example, 5 seconds (although in other embodiments, this may range from 1 to 20 seconds, for example). In one embodiment, the number of write operations performed per unit time may be calculated by measuring the total number of storage operations performed over the monitoring period multiplied by a ratio indicating what percentage of storage operations are write operations, and dividing by a length of the monitoring period.

In sub-step 122, monitoring module 42 monitors the number of read operations performed per unit time (e.g., per second), storing the result as a performance characteristic 44 (e.g., performance characteristic 44(b)). This monitoring may be performed over the course of a monitoring period, such as, for example, 5 seconds (although in other embodiments, this may range from 1 to 20 seconds, for example). In one embodiment, the number of read operations performed per unit time may be calculated by measuring a total number of storage operations performed over the monitoring period multiplied by a ratio indicating what percentage of storage operations are read operations (or 1 minus the ratio indicating what percentage of storage operations are write operations), and dividing by a length of the monitoring period.

In sub-step 123, monitoring module 42 monitors the write bandwidth, storing the result as a performance characteristic 44 (e.g., performance characteristic 44(c)). This monitoring may be performed over the course of a monitoring period, such as, for example, 5 seconds (although in other embodiments, this may range from 1 to 20 seconds, for example). In one embodiment, the write bandwidth may be calculated by measuring a total storage bandwidth achieved over the monitoring period multiplied by the ratio indicating what percentage of storage operations are write operations.

In sub-step 124, monitoring module 42 monitors the read bandwidth, storing the result as a performance characteristic 44 (e.g., performance characteristic 44(d)). This monitoring may be performed over the course of a monitoring period, such as, for example, 5 seconds (although in other embodiments, this may range from 1 to 20 seconds, for example). In one embodiment, the read bandwidth may be calculated by measuring the total storage bandwidth achieved over the monitoring period multiplied by multiplied by the ratio indicating what percentage of storage operations are read operations (or 1 minus the ratio indicating what percentage of storage operations are write operations).

It should be understood that although only four performance characteristics 44(a), 44(b), 44(c), 44(d) have been described, any number of performance characteristics 44 may be used, and they are not limited to the particular performance characteristics 44 described in sub-steps 121-124.

In sub-step 126, monitoring module 42 normalizes each of the monitored performance characteristics 44 to a number of cores 35 assigned to performing tasks relevant to that performance characteristic 44. For example, if write operations are performed exclusively by cores 35(1) and 35(2), while read operations are performed exclusively by core 35(3), then the write performance characteristics 44(a), 44(c) are each divided by 2 (for 2 cores), while the read performance characteristics 44(b), 44(d) are each divided by 1 (for 1 core). In some embodiments, if different cores 35 operate at different frequencies, or if cores 35 may change operation frequencies over time, monitoring module 42 further normalizes based on core frequency. Thus, for example, if core 35(1) operated at 1 GHz over the entire monitoring period and core 35(2) operated at 1 GHz for half the monitoring period and 500 MHz for half the monitoring period, while core 35(3) operated at 600 MHz over the entire monitoring period, then write performance characteristics 44(a), 44(c) would be divided by (1000 MHz+(1000 MHz+500 MHz)/2)=1.75 GHz, while read performance characteristics 44(b), 44(d) would be divided by 600 MHz.

In step 130, monitoring module 42 periodically calculates a linear combination of the performance characteristics 44 to yield a combined metric 48. This linear combination is performed using a pre-defined set of coefficients 46. Thus, for example, performance characteristic 44(a) is multiplied by coefficient 46(a), performance characteristic 44(b) is multiplied by coefficient 46(b), performance characteristic 44(c) is multiplied by coefficient 46(c), and performance characteristic 44(d) is multiplied by coefficient 46(d). These products are then added together to yield the combined metric 48. In some embodiments, the particular values of the coefficients 46 are calculated in advance by using linear regression. For example, several different computing devices (similar to computing device 32) with differing hardware configurations may be saturated with storage commands, the performance characteristics 44 may be measured on each, and linear regression may be performed on the entire data set to derive coefficients 46 that come closest to generating a combined metric 48 equal to 1.0 across all the different hardware platforms at saturation.

Step 130 is performed periodically. In some embodiments, the periodicity is within a range of 1 second to 20 seconds, for example. In one particular example embodiment, the periodicity is 5 seconds.

In step 140, monitoring module 42 detects that the combined metric 48 exceeds a threshold, such as, for example, a high watermark 60. In one example embodiment, high watermark 60 may be 0.8.

In response to the detection of step 140, in step 150, computing device 32 transitions from operating in the first processing mode 50(1) to instead operate in the second processing mode 50(2). Second processing mode 50(2) has a higher bandwidth than the first processing mode 50(1). Thus, for example, when computing device 32 operates in second processing mode 50(2), the total storage bandwidth and the total number of storage operations per second is higher, on average, than when computing device 32 operates in processing mode 50(1). In addition, second processing mode 50(2) processes the input data 70 in a less complete or less robust manner than does first processing mode 50(1). For example, in a data storage embodiment (see e.g., FIG. 3A), first processing mode 50(1) performs data deduplication (e.g., by inline deduplication processing module 53) and/or data compression on the input data 70 in real time, while second processing mode 50(2) does not perform data deduplication and/or data compression on the input data 70. In another example, in a graphics embodiment (see e.g., FIG. 3B), first processing mode 50(1) performs anti-aliasing on the input data 70 in real time, while second processing mode 50(2) does not perform anti-aliasing on the input data 70.

Figure 4:
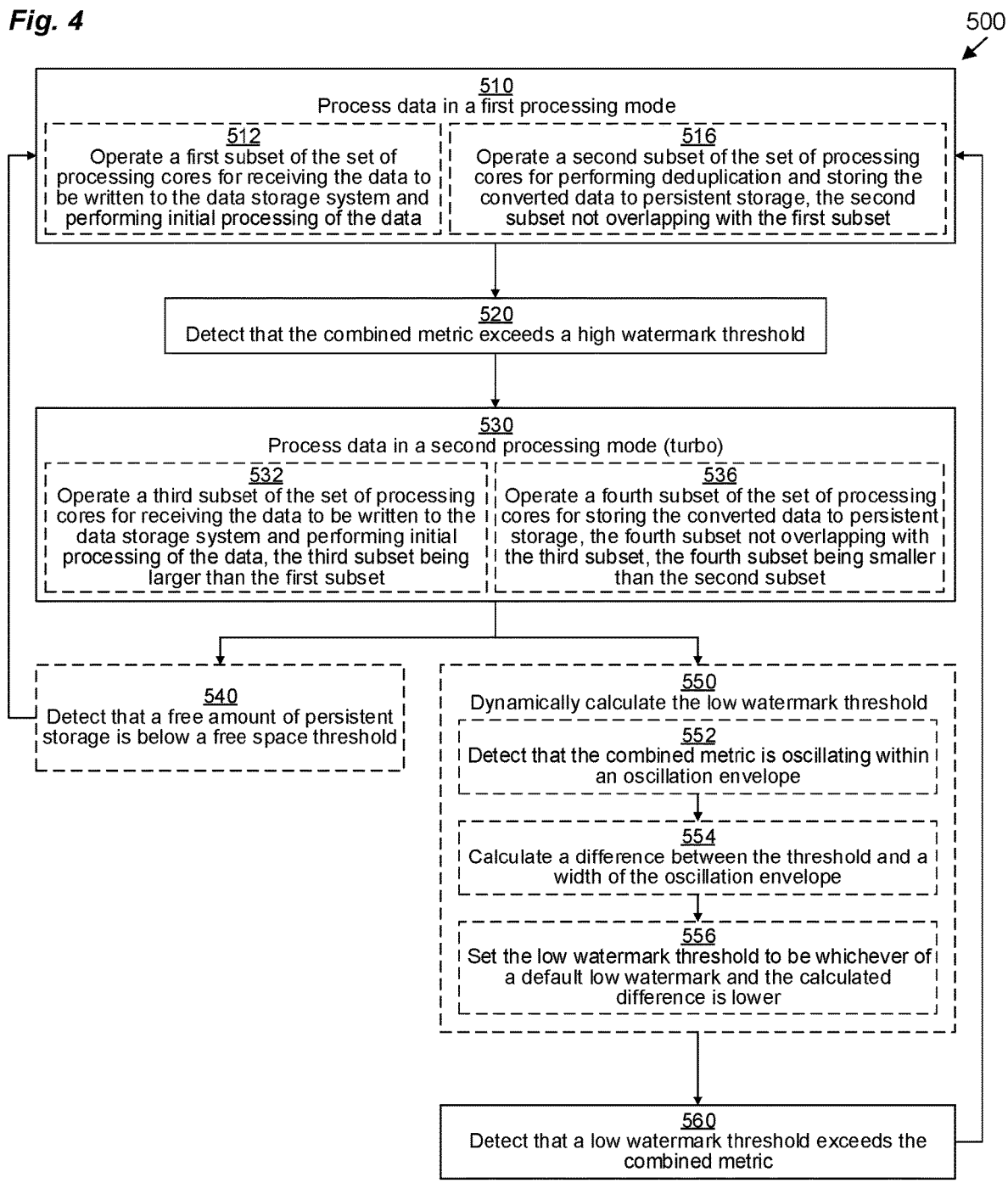
FIG. 4 is a flowchart depicting an example procedure according to various embodiments.

FIG. 4 illustrates an example method 500 performed by computing device 32. It should be understood that method 500 may overlap in many respects with method 100, but it is described from a different perspective.

Figure 5:
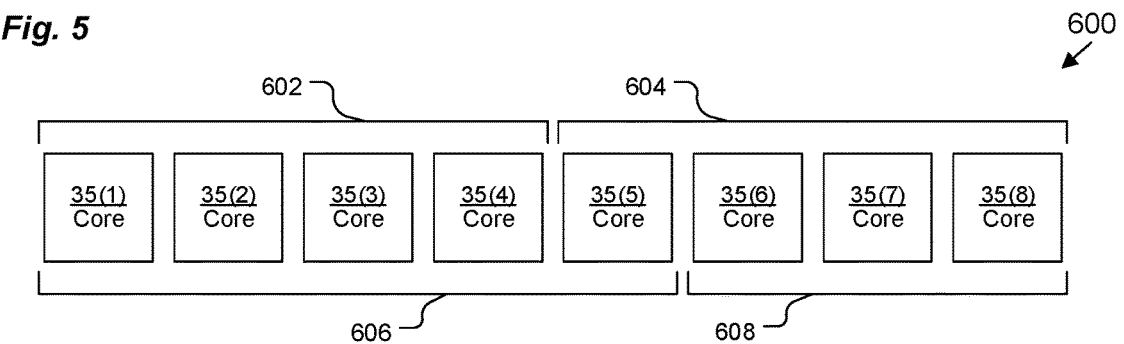
FIG. 5 is a block diagram depicting example assignments of processing cores according to an example embodiment.

In step 510, computing device 32 processes input data 70 in a first processing mode 50(1). In some embodiments, computing device 32 performs step 510 by performing sub-steps 512 and 516. Sub-steps 512, 516 may best be illustrated with reference to an arrangement 600 from FIG. 5.

In sub-step 512, computing device 32 operates a first subset 602 of a set of processing cores 35 for receiving (see step 220 from FIG. 3A) the input data 70 to be written to the data storage system and performing initial processing of the data (e.g., by front-end processing module 52), while in sub-step 516, computing device 32 operates a second subset 604 of the set of processing cores 35 for performing deduplication (e.g., by deduplication processing module 54) and storing (e.g., by flush processing module 56) the converted data 72 to persistent storage 38 (see step 240 from FIG. 3A), the second subset 604 not overlapping with the first subset 602. As depicted, first subset 602 has four cores 35(1), 35(2), 35(3), 35(4), while second subset 604 has four cores 35(5), 35(6), 35(7), 35(8). It should be understood that there may also be additional cores 35 of the processing circuitry 36 that are assigned neither to the first or second subsets 602, 604 during step 510.

It should be understood that, although not depicted in FIG. 4, steps 120 and 130 of FIG. 2 are performed in parallel with step 510.

In step 520, monitoring module 42 detects that the combined metric 48 exceeds the high watermark 60, and, in response, computing device 32 ceases operating in first processing mode 50(1), and instead begins (step 530) to process input data 70 in a second processing mode 50(2). In some embodiments, computing device 32 performs step 530 by performing sub-steps 532 and 536. Sub-steps 532, 536 may best be illustrated with reference to arrangement 600 from FIG. 5.

In sub-step 532, computing device 32 operates a third subset 606 of the set of processing cores 35 for receiving (see step 220 from FIG. 3A) the input data 70 to be written to the data storage system and performing initial processing of the data (e.g., by front-end processing module 52), the third subset 606 being larger than the first subset 602. In sub-step 536, computing device 32 operates a fourth subset 608 of the set of processing cores 35 for storing (e.g., by flush processing module 56) the converted data 72 to persistent storage 38, the fourth subset 608 not overlapping with the third subset 606, the fourth subset 608 being smaller than the second subset 604. As depicted, third subset 606 has five cores 35(1), 35(2), 35(3), 35(4), 35(5), which is more than the four cores 35(1), 35(2), 35(3), 35(4) of the first subset 602. Fourth subset 606 has three cores 35(6), 35(7), 35(8), which is fewer than the four cores 35(5), 35(6), 35(7), 35(8) of the second subset 604. It should be understood that there may also be additional cores 35 of the processing circuitry 36 that are assigned neither to the third or fourth subsets 606, 608 during step 530.

It should be understood that, although not depicted in FIG. 4, steps 120 and 130 of FIG. 2 are performed in parallel with step 530. In some embodiments, in addition to performing steps 120, 130, monitoring module 42 also keeps track of an amount of free space available on persistent storage 38.

In some embodiments, in step 540, monitoring module 42 may detect, while the computing device 32 operates in the second processing mode 50(2), that a free amount of persistent storage 38 is below a free space threshold. For example, if the amount of free space drops below 5%, then the data storage system is in danger of running out of room, which means that deduplication and/or compression would be helpful in freeing up additional space. Thus, in response to step 540, computing device 32 transitions back to operating in the first processing mode 50(1) (step 510).

If step 540 is not performed (i.e., in embodiments that lack step 540 or if the free space does not drop low enough), then step 560 may be performed instead. In step 560, monitoring module 42 detects that the low watermark 62 exceeds the combined metric 48, and, in response, computing device 32 ceases operating in second processing mode 50(2), and instead begins (step 510) to process input data 70 in the first processing mode 50(1).

In embodiments in which low watermark 62 is a variable rather than a constant, monitoring module 42 performs step 550 repeatedly in parallel with step 530, in preparation for step 560. In step 550, monitoring module 42 dynamically calculates the value of the low watermark 62 using sub-steps 552, 554, 556.

Figure 6:
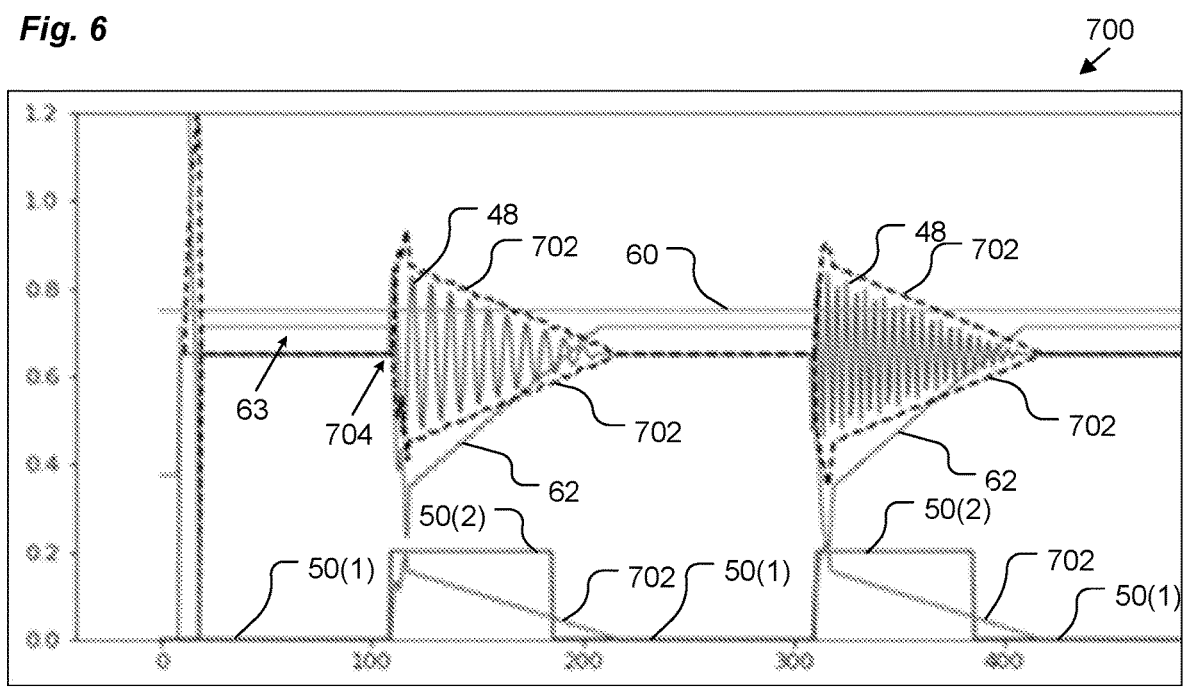
FIG. 6 is a graph depicting an example combined metric over time according to various embodiments.

In sub-step 552, monitoring module 42 detects that the combined metric 48 is oscillating within an oscillation envelope 702, with reference to FIG. 6. FIG. 6 depicts an example graph 700 of combined metric 48 as it changes over time. As can be seen in graph 700, after an initial spike, combined metric 48 has a constant value of about 0.63, but shortly after 100 minutes, the combined metric 48 jumps up to a value of about 0.8, which is above the high watermark 60 (which, as depicted, has a value of about 0.75). Thus, as can be seen at the bottom of the graph, computing device 32 operates in first processing mode 50(1) up until shortly after 100 minutes, after which it transitions to operating in second processing mode 50(2). However, combined metric 48 then proceeds to oscillate around a central value 704 (about 0.63) with a period of around 10 minutes for approximately 100 minutes. If the low watermark 62 were set to be a constant with a value of 0.7 (as the default low watermark value 63 is depicted), then the computing device 32 would flip back and forth between processing modes 50(1), 50(2). Instead, monitoring module 42 determines that the combined metric 48 is oscillating within a triangular window 702.

Mathematically, monitoring module 42 may perform sub-step 552 by performing a Fast Fourier Transform (FFT) on a small set of recent values of the combined metric and performing some additional math beyond that. Thus, as depicted, if the combined metric 48 is calculated every 15 seconds and the FFT is applied to the past 10 values, the FFT will look back approximately 2.5 minutes. Let be x our history metrics samples of size M: x[0, . . . M−1] for M=10. Then let X=FFT(x). Then X[0] yields the zero frequency component (or "direct current" or "DC" value: DC=X[0]. The oscillating component ("OC") 702 is then defined to be:

$$OC = \sum_{k=1}^{M-1} \|X[k]\| \tag{1}$$

Then, in sub-step 554, monitoring module 42 calculates a difference between the threshold and a width of the oscillation envelope 702. The oscillation envelope 702 can be defined as extending from a low envelope value (ENVL) to a high envelope value (ENVH) as such:

$$ENVH = \frac{(DC + OC)}{M} \tag{2}$$

$$ENVL = \frac{(DC - OC)}{M} \tag{3}$$

Thus, at any given instant, the width, W, of the oscillation envelope 702 is given as W=ENVH−ENVL. Then, the difference, DIFF, is defined to be the value of the high watermark 60 minus the width of the oscillation envelope 702, W.

Then, in sub-step 556, monitoring module 42 sets the low watermark 62 to be equal to whichever of DIFF and the default low watermark 63 is lower. Thus, as can be seen in graph 700, the low watermark 62 drops to a value of about 0.35 shortly after 100 minutes, and then slowly increases as the width, W, of the oscillation envelope 702 decreases, up until the low watermark 62 reaches the value of the default low watermark 63, at which point, the low watermark 62 remains constant (shortly after 200 minutes), until the next oscillation begins, shortly after 300 minutes.

Thus, techniques have been presented techniques for operating a storage system to efficiently toggle between normal mode 50(1) and turbo mode 50(2) in a manner that is responsive to widely varying conditions. This may be accomplished by periodically monitoring (step 120) performance characteristics 44 and taking a predefined linear combination (step 130) of those values to yield a combined metric 48 that can be used to easily assess load. When the combined metric 48 rises above a high watermark 60, turbo mode 50(2) may be engaged; when the combined metric 48 drops below a low watermark 62, turbo mode 50(2) may be disengaged. In some embodiments, the low watermark 62 may be dynamically adjusted to prevent constant switching in the event of rapid oscillation (see FIG. 6) of the combined metric 48. It should be understood that although described in the context of a data storage system (e.g., FIGS. 1 and 3A), such techniques can also be used in other data processing contexts, such as for computer graphics (e.g., FIG. 3B) and machine learning (e.g., FIG. 3C).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of operating a computing device for processing data, the method comprising:
    monitoring a set of performance characteristics of the processing of the data, the processing includes (1) receiving data to be written to a data storage system, (2) converting the data to a format for being written to the data storage system, and (3) storing the converted data to persistent storage of the data storage system, the performance characteristics including respective rates of processing storage commands;
    periodically calculating, using a predefined set of coefficients, a linear combination of the monitored set of performance characteristics to yield a combined metric, the coefficients being effective to generate the combined metric equal to a normalized value across different hardware platforms at saturation in which the respective hardware platforms are saturated with processing of storage commands; and
    upon detecting that the combined metric exceeds a threshold while operating in a first processing mode, transitioning from operating in the first processing mode to operating in a second processing mode, wherein:
        the second processing mode has a higher bandwidth than the first processing mode and
        processing of data in the second processing mode is less robust than processing of data in the first processing mode,
    wherein converting the data to the format for being written to the data storage system includes:
        while operating in the first processing mode, performing a deduplication step on the data prior to storing the converted data to the persistent storage, the deduplication step being configured to replace duplicate blocks within the data with pointers to previously-stored versions of those duplicate blocks; and
        while operating in the second processing mode, refraining from performing the deduplication step on the data prior to storing the converted data to the persistent storage.

2. The method of claim 1 wherein the monitored set of performance characteristics include:
    write operations per unit time;
    read operations per unit time;
    write bandwidth per unit time; and
    read bandwidth per unit time.

3. The method of claim 2 wherein monitoring the set of performance characteristics includes normalizing the monitored set of performance characteristics to processor frequency.

4. The method of claim 1 wherein the method further comprises, upon returning to the first processing mode, performing, as a background operation, the deduplication step on the converted data that was stored to the persistent storage during operation of the second processing mode.

5. The method of claim 1,
    wherein the computing device has a set of processing cores;
    wherein operating in the first processing mode includes:
        operating a first subset of the set of processing cores for receiving the data to be written to the data storage system and performing initial processing of the data and
        operating a second subset of the set of processing cores for performing deduplication and storing the converted data to persistent storage, the second subset not overlapping with the first subset; and
    wherein operating in the second processing mode includes:
        operating a third subset of the set of processing cores for receiving the data to be written to the data storage system and performing initial processing of the data, the third subset being larger than the first subset, and
        operating a fourth subset of the set of processing cores for storing the converted data to persistent storage, the fourth subset not overlapping with the third subset, the fourth subset being smaller than the second subset.

6. The method of claim 1 wherein the method further comprises, upon detecting that a free amount of persistent storage is below a free space threshold while operating in the second processing mode, transitioning from operating in the second processing mode to operating in the first processing mode.

7. The method of claim 1 wherein the method further comprises, upon detecting that another threshold exceeds the combined metric while operating in the second processing mode, transitioning from operating in the second processing mode to operating in the first processing mode.

8. The method of claim 7 wherein the method further comprises, while operating in the second processing mode, dynamically calculating the other threshold by:
    detecting that the combined metric is oscillating within an oscillation envelope;
    calculating a difference between the threshold and a width of the oscillation envelope; and
    setting the other threshold to be whichever of a default threshold and the calculated difference is lower.

9. The method of claim 1 wherein periodically calculating the combined metric is performed at a periodicity within a range of 1 second to 20 seconds.

10. A computer program product comprising a non-transitory computer-readable storage medium that stores a set of instructions, which, when performed by a computing device, processes data by:
- monitoring a set of performance characteristics of the processing of the data, the processing includes (1) receiving data to be written to a data storage system, (2) converting the data to a format for being written to the data storage system, and (3) storing the converted data to persistent storage of the data storage system, the performance characteristics including respective rates of processing storage commands;
- periodically calculating, using a predefined set of coefficients, a linear combination of the monitored set of performance characteristics to yield a combined metric, the coefficients being effective to generate the combined metric equal to a normalized value across different hardware platforms at saturation in which the respective hardware platforms are saturated with processing of storage commands; and
- upon detecting that the combined metric exceeds a threshold while operating in a first processing mode, transitioning from operating in the first processing mode to operating in a second processing mode, wherein:
  - the second processing mode has a higher bandwidth than the first processing mode and
  - processing of data in the second processing mode is less robust than processing of data in the first processing mode,
- wherein converting the data to the format for being written to the data storage system includes:
  - while operating in the first processing mode, performing a deduplication step on the data prior to storing the converted data to the persistent storage, the deduplication step being configured to replace duplicate blocks within the data with pointers to previously-stored versions of those duplicate blocks; and
  - while operating in the second processing mode, refraining from performing the deduplication step on the data prior to storing the converted data to the persistent storage.

11. The computer program product of claim 10,
- wherein the computing device has a set of processing cores;
- wherein operating in the first processing mode includes:
  - operating a first subset of the set of processing cores for receiving the data to be written to the data storage system and performing initial processing of the data and
  - operating a second subset of the set of processing cores for performing deduplication and storing the converted data to persistent storage, the second subset not overlapping with the first subset; and
- wherein operating in the second processing mode includes:
  - operating a third subset of the set of processing cores for receiving the data to be written to the data storage system and performing initial processing of the data, the third subset being larger than the first subset, and
  - operating a fourth subset of the set of processing cores for storing the converted data to persistent storage, the fourth subset not overlapping with the third subset, the fourth subset being smaller than the second subset.

12. The computer program product of claim 10 wherein the set of instructions, when performed by the computing device, further cause the computing device to, upon detecting that another threshold exceeds the combined metric while operating in the second processing mode, transition from operating in the second processing mode to operating in the first processing mode.

13. The computer program product of claim 12 wherein the set of instructions, when performed by the computing device, further cause the computing device to, while operating in the second processing mode, dynamically calculate the other threshold by:
- detecting that the combined metric is oscillating within an oscillation envelope;
- calculating a difference between the threshold and a width of the oscillation envelope; and
- setting the other threshold to be whichever of a default threshold and the calculated difference is lower.

14. An apparatus comprising:
memory; and
processing circuitry coupled to the memory, configured to processes data by:
- monitoring a set of performance characteristics of the processing of the data, the processing includes (1) receiving data to be written to a data storage system, (2) converting the data to a format for being written to the data storage system, and (3) storing the converted data to persistent storage of the data storage system, the performance characteristics including respective rates of processing storage commands;
- periodically calculating, using a predefined set of coefficients, a linear combination of the monitored set of performance characteristics to yield a combined metric, the coefficients being effective to generate the combined metric equal to a normalized value across different hardware platforms at saturation in which the respective hardware platforms are saturated with processing of storage commands; and
- upon detecting that the combined metric exceeds a threshold while operating in a first processing mode, transitioning from operating in the first processing mode to operating in a second processing mode, wherein:
  - the second processing mode has a higher bandwidth than the first processing mode and
  - processing of data in the second processing mode is less robust than processing of data in the first processing mode,
- wherein converting the data to the format for being written to the data storage system includes:
  - while operating in the first processing mode, performing a deduplication step on the data prior to storing the converted data to the persistent storage, the deduplication step being configured to replace duplicate blocks within the data with pointers to previously-stored versions of those duplicate blocks; and
  - while operating in the second processing mode, refraining from performing the deduplication step on the data prior to storing the converted data to the persistent storage.

* * * * *